(12) United States Patent
Hou et al.

(10) Patent No.: US 11,501,525 B2
(45) Date of Patent: Nov. 15, 2022

(54) SYSTEMS AND METHODS FOR PANOPTIC IMAGE SEGMENTATION

(71) Applicant: Toyota Research Institute, Inc., Los Altos, CA (US)

(72) Inventors: Rui Hou, Issaquah, WA (US); Jie Li, Los Altos, CA (US); Vitor Guizilini, Santa Clara, CA (US); Adrien David Gaidon, Mountain View, CA (US); Dennis Park, Fremont, CA (US); Arjun Bhargava, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 338 days.

(21) Appl. No.: 16/843,026

(22) Filed: Apr. 8, 2020

(65) Prior Publication Data

US 2021/0158043 A1    May 27, 2021

Related U.S. Application Data

(60) Provisional application No. 62/940,517, filed on Nov. 26, 2019.

(51) Int. Cl.
*G06V 20/10*    (2022.01)
*G06T 7/10*    (2017.01)
(Continued)

(52) U.S. Cl.
CPC ........... *G06V 20/10* (2022.01); *G06K 9/6256* (2013.01); *G06T 7/10* (2017.01); *G06V 10/955* (2022.01)

(58) Field of Classification Search
USPC .......................... 382/103, 173, 305, 155–156
See application file for complete search history.

(56) References Cited

U.S. PATENT DOCUMENTS 10,424,064 B2 * 9/2019 Price ........................ G06T 7/11
10,796,201 B2 * 10/2020 Li ........................ G06N 3/0454
(Continued)

OTHER PUBLICATIONS

Weber et al., "Single-Shot Panoptic Segmentation," arXiv:1911.00764v1, Nov. 2, 2019, found at https://arxiv.org/pdf/1911.00764.pdf.

(Continued)

*Primary Examiner* — Ishrat I Sherali
(74) *Attorney, Agent, or Firm* — Christopher G. Darrow; Darrow Mustafa PC

(57) ABSTRACT

Systems and methods for panoptic image segmentation are disclosed herein. One embodiment performs semantic segmentation and object detection on an input image, wherein the object detection generates a plurality of bounding boxes associated with an object in the input image; selects a query bounding box from among the plurality of bounding boxes; maps at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object; compares the mask assignment with results of the semantic segmentation to produce a refined mask assignment for the object; and outputs a panoptic segmentation of the input image that includes the refined mask assignment for the object.

17 Claims, 7 Drawing Sheets

(51) Int. Cl.
*G06K 9/62* (2022.01)
*G06V 10/94* (2022.01)

(56) References Cited

U.S. PATENT DOCUMENTS

| | | | |
|---|---|---|---|
| 10,984,286 B2* | 4/2021 | Dundar | G06T 15/00 |
| 11,107,219 B2* | 8/2021 | Cohen | G06V 10/50 |
| 11,256,960 B2* | 2/2022 | Lee | G06N 3/08 |
| 2002/0136449 A1* | 9/2002 | Park | G06V 10/56 382/164 |
| 2019/0244060 A1 | 8/2019 | Dundar et al. | |
| 2019/0332625 A1* | 10/2019 | Lee | G06V 10/40 |
| 2020/0082219 A1* | 3/2020 | Li | G06N 3/0454 |
| 2021/0027471 A1* | 1/2021 | Cohen | G06V 10/56 |
| 2021/0263962 A1* | 8/2021 | Chang | G06V 10/82 |

OTHER PUBLICATIONS

De Geus et al., "Fast Panoptic Segmentation Network," arXiv:1910.03892v1, Oct. 9, 2019, found at https://arxiv.org/pdf/1910.03892.pdf.
Petrovai et al., "Multi-Task Network for Panoptic Segmentation in Automated Driving," 2019 IEEE Intelligent Transportation Systems Conference (ITSC), Auckland, NZ, Oct. 27-30, 2019, abstract linked at https://ieeexplore.ieee.org/abstract/document/8917422.
Cao et al., "Triply Supervised Decoder Networks for Joint Detection and Segmentation," Open Access CVPR paper, 2019, found at http://openaccess.thecvf.com/content_CVPR_2019/papers/Cao_Triply_Supervised_Decoder_Networks_for_Joint_Detection_and_Segmentation_CVPR_2019_paper.pdf.
Chen et al., "SpatialFlow: Bridging All Tasks for Panoptic Segmentation," arXiv:1910.08787v2, Dec. 2, 2019, found at https://arxiv.org/pdf/1910.08787.pdf.
Cheng, "Panoptic-DeepLab: A Simple, Strong, and Fast Baseline for Bottom-Up Panoptic Segmentation," arXiv:1911.10194v1, Nov. 22, 2019, found at https://arxiv.org/pdf/1911.10194 pdf.
Gao et al., "SSAP: Single-Shot Instance Segmentation with Affinity Pyramid," Open Access ICCV paper, 2019, found at http://openaccess.thecvf.com/content_ICCV_2019/papers/Gao_SSAP_Single-Shot_Instance_Segmentation_With_Affinity_Pyramid_ICCV_2019_paper.pdf.
Kirillov et al., "Panoptic Segmentation," Open Access CVPR paper, 2019, found at http://openaccess.thecvf.com/content_CVPR_2019/papers/Kirillov_Panoptic_Segmentation_CVPR_2019_paper.pdf.
Uhrig et al., "Box2Pix: Single-Shot Instance Segmentation by Assigning Pixels to Object Boxes," 2018, found at https://lmb.informatik.uni-freiburg.de/Publications/2018/UB18/paper-box2pix.pdf.
Yang et al., "DeeperLab: Single-Shot Image Parser," arXiv:1902.05093v2, Mar. 12, 2019, found at https://arxiv.org/odf/1902.05093.pdf.
Cordts, et al., The cityscapes dataset for semantic urban scene understanding, In Proceedings of the IEEE conference on computer vision and pattern recognition, pp. 3213-3223, 2016.
He et al., "Deep residual learning for image recognition", found at: arXiv:1512.03385v1 [cs.CV] Dec. 10, 2015.
Kirillov et al., "Panoptic feature pyramid networks", found at: arXiv:1901.02446v2 [cs.CV] Apr. 10, 2019.
Li et al., "Learning to fuse things and stuff", found at: arXiv:1812.01192v1 [cs.CV] Dec. 4, 2018.
Lin et al., "Feature pyramid networks for object detection", found at: arXiv:1612.03144v2 [cs.CV] Apr. 19, 2017.
Porzi et al., "Seamless scene segmentation", found at: arXiv:1905.01220v1 [cs.CV] May 3, 2019.
Bolya et al., "YOLACT: real-time instance segmentation", found at: arXiv:1904.02689v2 [cs.CV] Oct. 24, 2019.
Chen et al.."Hybrid Task Cascade for Instance Segmentation", found at: arXiv:1901.07518v2 [cs.CV] Apr. 9, 2019.
Yu et al., "UnitBox: An Advanced Object Detection Network", found at: arXiv:1608.01471v1 [cs.CV] Aug. 4, 2016.
De Brabandere et al., "Semantic instance segmentation with a discriminative loss function" found at arXiv: 1708.02551v1 [cs CV] Aug. 8, 2017.
Hariharan et al., "Simultaneous detection and segmentation", found at: arXiv:1407.1808v1 [cs.CV] Jul. 7, 2014.
He et al., "Mask R-CNN", found at: arXiv:1703.06870v1 [cs.CV] Mar. 20, 2017.
Wu et al., "Bridging Category-level and Instance-level Semantic Image Segmentation", found at: arXiv:1605.06885v1 [cs.CV] May 23, 2016.
Xie et al., "PolarMask: Single Shot Instance Segmentation with Polar Representation", found at: arXiv:1909.13226v4 [cs CV] Feb. 26, 2020.
Xiong et al., "UPSNet: A Unified Panoptic Segmentation Network", found at: arXiv:1901.03784v2 [cs.CV] Apr. 3, 2019.
Xu et al., "Explicit Shape Encoding for Real-Time Instance Segmentation", found at: arXiv: 1908.04067v1 [cs.CV] Aug. 12, 2019.
Huang et al., "Mask scoring r-cnn", found at: arXiv:1903.00241v1 [cs.CV] Mar. 1, 2019.
Li et al., "Attention-guided unified network for panoptic segmentation", found at: inarXiv: 1812.03904v2 [cs.CV] Apr. 17, 2019.
Liang et al., "Proposal-free network for instance-level object segmentation" found at: arXiv:1509.02636v2 [ cs.CV] Sep. 10, 2015.
Lin et al., "Focal loss for dense object detection", found at: arXiv:1708.02002v1 [cs.CV] Aug. 7, 2017.
Lin et al.,". Microsoft coco: Common objects in context" found at: arXiv:1405.0312v2 [cs.CV] Jul. 5, 2014.
Liu et al., "An end-to-end network for panoptic segmentation", In Proceedings of the IEEE Conference on Computer Vision and Pattern Recognition, pp. 6172-6181, 2019.
Liu et al., "Path aggregation network for instance segmentation" found at: arXiv: 1803.01534v4 [cs.CV] Sep. 18, 2018.
Neven et al., "Instance segmentation by jointly optimizing spatial embeddings and clustering bandwidth" found at arXiv: 1906.11109v2 [cs CV] Aug. 2, 2019.
Newell et al., "End-to-end learning for joint detection and grouping" found at: arXiv: 1611.05424v2 [cs.CV] Jun. 9, 2017.
Pohlen et al., "Full-resolution residual networks for semantic segmentation in street scenes" found at arXiv: 1611.08323v2 [cs.CV] Dec. 6, 2016.
Redmon et al., "Yolov3: An incremental improvement", found at: arXiv: 1804.02767v1 [cs.CV] Apr. 8, 2018.
Sofiiuk et al., "AdaptIS: Adaptive Instance Selection Network" found at: arXiv:1909.07829v1 [cs.CV] Sep. 17, 2019.
Tian et al., "FCOS: Fully Convolutional One-Stage Object Detection" found at: arXiv:1904.01355v5 [cs.CV] Aug. 20, 2019.

* cited by examiner

SYSTEMS AND METHODS FOR PANOPTIC IMAGE SEGMENTATION

CROSS-REFERENCE TO RELATED APPLICATION

This application claims the benefit of U.S. Provisional Patent Application No. 62/940,517, "Real-Time Panoptic Segmentation from Dense Detections," filed Nov. 26, 2019, which is incorporated by reference herein in its entirety.

TECHNICAL FIELD

The subject matter described herein generally relates to robotics and machine vision and, more particularly, to systems and methods for panoptic image segmentation.

BACKGROUND

Scene understanding is the basis of a variety of real-world applications such as autonomous driving, other robotics applications, and image editing. Panoptic segmentation, a scene-understanding task that arises in some applications, aims to provide a complete two-dimensional (2D) description of a scene. In panoptic segmentation, each pixel in an input image is assigned a semantic class (as in semantic segmentation), and each object instance is also identified and segmented (as in instance segmentation). The image pixels are sometimes categorized into two high-level classes: "stuff," representing amorphous and uncountable regions (e.g., sky and roadway), and "things," representing countable objects such as people and vehicles. Some conventional panoptic segmentation systems are hampered by prohibitively slow inference speeds, and efforts to increase the speed of inference can cause accuracy to suffer.

SUMMARY

An example of a system for panoptic image segmentation is presented herein. The system comprises one or more processors and a memory communicably coupled to the one or more processors. The memory stores a neural network module including instructions that when executed by the one or more processors cause the one or more processors to perform semantic segmentation and object detection on an input image, wherein the object detection generates a plurality of bounding boxes associated with an object in the input image. The memory also stores a fusion module including instructions that when executed by the one or more processors cause the one or more processors to select a query bounding box from among the plurality of bounding boxes. The fusion module also includes instructions that when executed by the one or more processors cause the one or more processors to map at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object. The fusion module also includes instructions that when executed by the one or more processors cause the one or more processors to compare the mask assignment with results of the semantic segmentation to produce a refined mask assignment for the object. The fusion module also includes instructions that when executed by the one or more processors cause the one or more processors to output a panoptic segmentation of the input image that includes the refined mask assignment for the object.

Another embodiment is a non-transitory computer-readable medium for panoptic image segmentation and storing instructions that when executed by one or more processors cause the one or more processors to perform semantic segmentation and object detection on an input image, wherein the object detection generates a plurality of bounding boxes associated with an object in the input image. The instructions also cause the one or more processors to select a query bounding box from among the plurality of bounding boxes. The instructions also cause the one or more processors to map at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object. The instructions also cause the one or more processors to compare the mask assignment with results of the semantic segmentation to produce a refined mask assignment for the object. The instructions also cause the one or more processors to output a panoptic segmentation of the input image that includes the refined mask assignment for the object.

In another embodiment, a method of panoptic image segmentation is disclosed. The method comprises performing semantic segmentation and object detection on an input image, wherein the object detection generates a plurality of bounding boxes associated with an object in the input image. The method also includes selecting a query bounding box from among the plurality of bounding boxes. The method also includes mapping at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object. The method also includes comparing the mask assignment with results of the semantic segmentation to produce a refined mask assignment for the object. The method also includes outputting a panoptic segmentation of the input image that includes the refined mask assignment for the object.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments described herein streamline and improve existing panoptic-image-segmentation frameworks in at least two ways. First, most conventional accurate instance segmentation methods follow a "detect-then-segment" philosophy, but a significant amount of information is discarded during the "detect" (object-detection) phase. Specifically, "dense" object-detection algorithms first generate multiple bounding-box proposals (e.g., one per image pixel) corresponding to a single target object in the scene. Then, Non-Maximum Suppression (NMS) or an equivalent filtering process identifies the bounding-box proposals with the highest level of confidence and ignores the rest. This selection strategy discards the lower-ranking bounding-box proposals generated by the network, even though they might overlap significantly with ground truth. Various embodiments described herein improve on conventional approaches by, among other things, reusing the dense bounding-box proposals discarded by a filtering process such as NMS to recover instance masks directly, i.e., without re-sampling features or clustering post-processing.

Second, semantic segmentation captures much of the same information as object detection. For example, class predictions for object detection are a subset of those for semantic segmentation and are produced from identical representations. Hence, sharing computations across semantic-segmentation and object-detection streams can significantly reduce the overall complexity. The embodiments described herein reuse information across these two streams in a single-shot (single-stage) panoptic segmentation framework that achieves real-time inference speeds while maintaining high accuracy.

In summary, the embodiments described herein extend dense object detection and semantic segmentation by reusing discarded object-detection outputs via parameter-free global self-attention and sharing computations between object detection and semantic segmentation in a single-shot framework for real-time panoptic image segmentation that can achieve faster inference than conventional systems without sacrificing accuracy.

The techniques described herein can be applied to a variety of robotics applications involving panoptic image segmentation, including autonomous vehicles and a variety of other kinds of robots, including humanoid robots.

Figure 1:
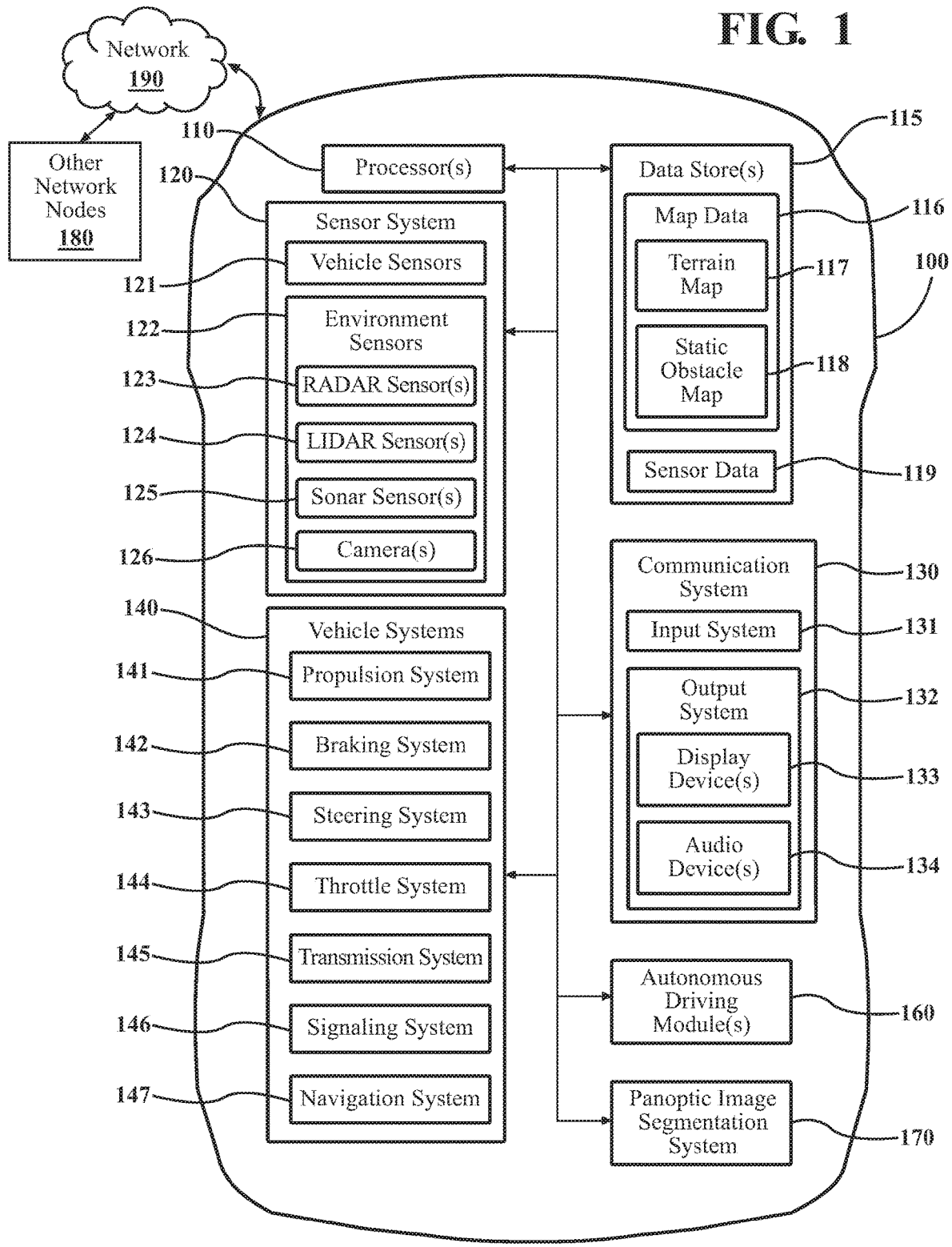
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. A vehicle 100 is only one example of an environment in which systems and methods disclosed herein can be implemented. As mentioned above, the techniques described herein have wide application to other areas of robotics, including humanoid robots. The vehicle 100 can include a panoptic image segmentation system 170 or components and/or modules thereof. As used herein, a "vehicle" is any form of motorized transport. In one or more implementations, the vehicle 100 can be an automobile. In some implementations, the vehicle 100 may be any other form of motorized transport. In various embodiments, vehicle 100 is capable of operating in a manual, semi-autonomous, parallel-autonomy, or fully autonomous mode. The vehicle 100 can include the panoptic image segmentation system 170 or capabilities to support or interact with the panoptic image segmentation system 170 and thus benefits from the functionality discussed herein. While arrangements will be described herein with respect to automobiles, it will be understood that implementations are not limited to automobiles. Instead, implementations of the principles discussed herein can be applied to any kind of vehicle and to devices and environments (e.g., robots) other than vehicles, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including panoptic image segmentation system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 180 (cloud servers, infrastructure systems, user mobile devices, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. In the embodiments described herein, image data from camera(s) 126 is of particular relevance because panoptic image segmentation system 170 can perform panoptic segmentation of input images from camera(s) 126. In some embodiments, the input images are in red-green-blue (RGB) format. In other embodiments, a different image format may be used.

Figure 2:
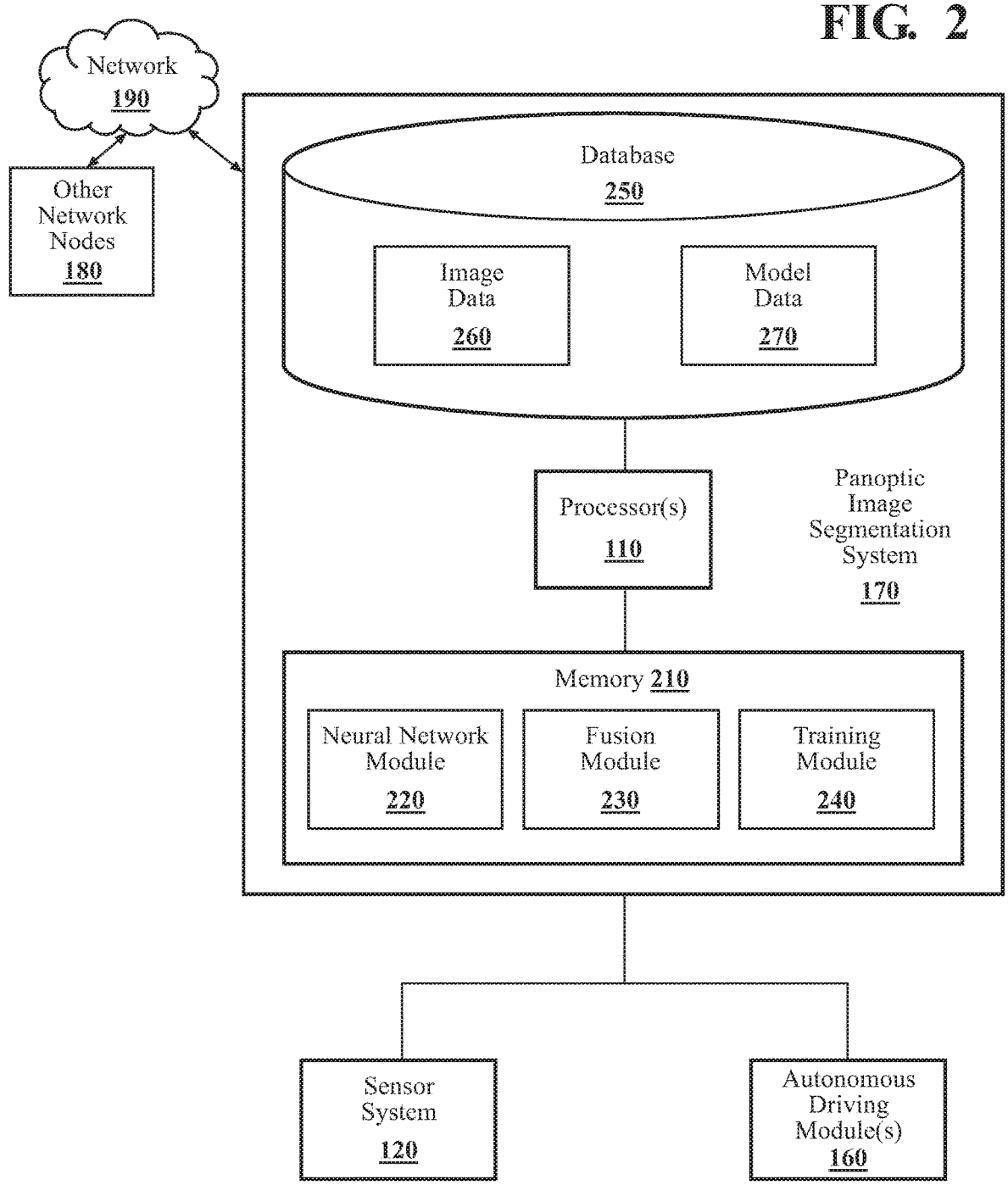
FIG. 2 illustrates one embodiment of a panoptic image segmentation system integrated with a vehicle.

Referring to FIG. 2, one embodiment of the panoptic image segmentation system 170 of FIG. 1 is further illustrated. In this embodiment, panoptic image segmentation system 170 is shown as including one or more processors 110 from the vehicle 100 of FIG. 1. In general, the one or more processors 110 may be a part of panoptic image segmentation system 170, panoptic image segmentation system 170 may include one or more separate processors from the one or more processors 110 of the vehicle 100, or panoptic image segmentation system 170 may access the one or more processors 110 through a data bus or another communication path, depending on the embodiment.

In one embodiment, memory 210 stores a neural network module 220, a fusion module 230, and a training module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein.

As shown in FIG. 2, panoptic image segmentation system 170 can communicate with one or more other network nodes 180 (e.g., cloud servers, infrastructure systems, user mobile devices, etc.) via network 190. In communicating with cloud servers, infrastructure systems (traffic signals, roadside units, etc.), or user mobile devices, panoptic image segmentation system 170 can employ a technology such as cellular data (LTE, 5G, etc.). As shown in FIG. 2, panoptic image segmentation system 170 can also interface and communicate with sensor system 120 and autonomous driving module(s) 160, in some embodiments.

In some embodiments, panoptic image segmentation system 170 stores image data 260 output by sensor system 120 (e.g., camera(s) 126) or acquired from another source in a database 250. In embodiments that include a training module 240, image data 260 can include a collection of sample images as training data for training one or more neural networks. In some embodiments, panoptic image segmentation system 170 stores, in database 250, model data 270 (e.g., intermediate calculations, bounding-box proposals, query bounding boxes, mask assignments, figures of merit, etc.) associated with its panoptic-segmentation processes.

The remainder of this description is organized as follows. First, an overview is provided of the functions performed by the various modules included in panoptic image segmentation system 170. Second, certain embodiments of panoptic image segmentation system 170 are described in greater detail, including the underlying mathematical concepts and techniques, in connection with FIGS. 4A, and 4B. Third, the methods associated with various embodiments are discussed via the flowchart of FIG. 5. Finally, a complete description of FIG. 1 is provided.

Training module 240, which pertains to a training phase of panoptic image segmentation system 170, generally includes instructions that when executed by the one or more processors 110 cause the one or more processors 110 to train one or more neural networks that perform object detection and semantic segmentation of an input image. In some embodiments, the training process is supervised to at least some degree. For example, in one embodiment, the training process is weakly supervised. This is described in greater detail below in connection with FIGS. 4A and 4B.

In some embodiments, panoptic image segmentation system 170 does not include training module 240. In those embodiments, the program code, parameters, and data for one or more trained neural networks can be downloaded to a panoptic image segmentation system 170 in a vehicle 100 or other robot from, e.g., a cloud server (see other network nodes 180 in FIGS. 1 and 2).

Neural network module 220 generally includes instructions that when executed by the one or more processors 110 cause the one or more processors 110 to perform semantic segmentation and object detection on an input image, the object-detection process generating a plurality of bounding boxes associated with an object in the input image. As mentioned above, in one embodiment, neural network module 220 produces a bounding-box proposal (herein sometimes referred to simply as a "bounding box") for each image pixel. Thus, an object including a plurality of pixels will have a plurality of bounding boxes associated with it. In some embodiments, each bounding box associated with the object has an associated confidence level.

In some embodiments, neural network module 220 performs object detection and semantic segmentation in parallel or substantially in parallel, and panoptic image segmentation system 170 operates in real time with respect to the frame rate of an imaging system (e.g., camera(s) 126, in a vehicular embodiment) that produces the input image. In some embodiments, the instructions in the neural network module 220 to perform semantic segmentation and object detection include instructions to perform semantic segmentation and object detection using a convolutional neural network (CNN). One illustrative neural-network architecture is discussed in greater detail below in connection with FIGS. 4A and 4B.

Fusion module 230 generally includes instructions that when executed by the one or more processors 110 cause the one or more processors 110 to select a query bounding box from among the plurality of bounding boxes associated with the object. In some embodiments, this is accomplished using a NMS algorithm. In other embodiments, a different filtering algorithm can be used. In one embodiment, the query bounding box is the bounding box among the plurality of bounding boxes associated with the object that has the highest confidence level. This is discussed in greater detail below.

Fusion module 230 also includes instructions to map at least one of the bounding boxes in the plurality of bounding boxes other than the query bounding box to the query bounding box based on similarity between the at least one of the bounding boxes and the query bounding box to generate a mask assignment (also referred to herein as an "instance mask") for the object. The mask assignment defines the contour (outline shape) of the object. In one embodiment, the similarity between a given bounding box and the query bounding box is quantified as the relative ratio of overlapping area between the bounding box in question and the query bounding box.

Fusion module 230 also includes instructions to compare the resulting mask assignment for the object with the results of the semantic segmentation performed by neural network module 220 to produce a refined mask assignment for the object. This may be considered a "clean-up" operation (e.g., differentiating between pixels associated with the object and pixels associated with a background "stuff" class such as "sky" or "roadway") prior to outputting the final panoptic segmentation of the input image.

Fusion module 230 also includes instructions to output a panoptic segmentation of the input image that includes the refined mask assignment for the object. As discussed further below, this is accomplished through a merging or fusion operation by fusion module 230. In some embodiments, the output panoptic segmentation of the input image includes, for each pixel in the input image, a semantic class identifier and an instance identifier. For example, pixels associated with a countable object such as a vehicle might have a semantic class identifier "vehicle" (an example of a "thing" class) and an instance identifier of "3," if that vehicle is labeled as the third vehicle among a plurality of identified vehicles in the input image. For pixels assigned to "stuff" classes, the instance identifier is set to zero, in some embodiments.

Though the foregoing discussion focuses on a particular detected object in the input image, the same functions for producing a panoptic segmentation of the input image can be performed for each of a plurality of objects in the input image, where the input image includes multiple objects. In other words, the techniques described above can be generalized to an input image that includes a plurality of objects.

Figure 3A:
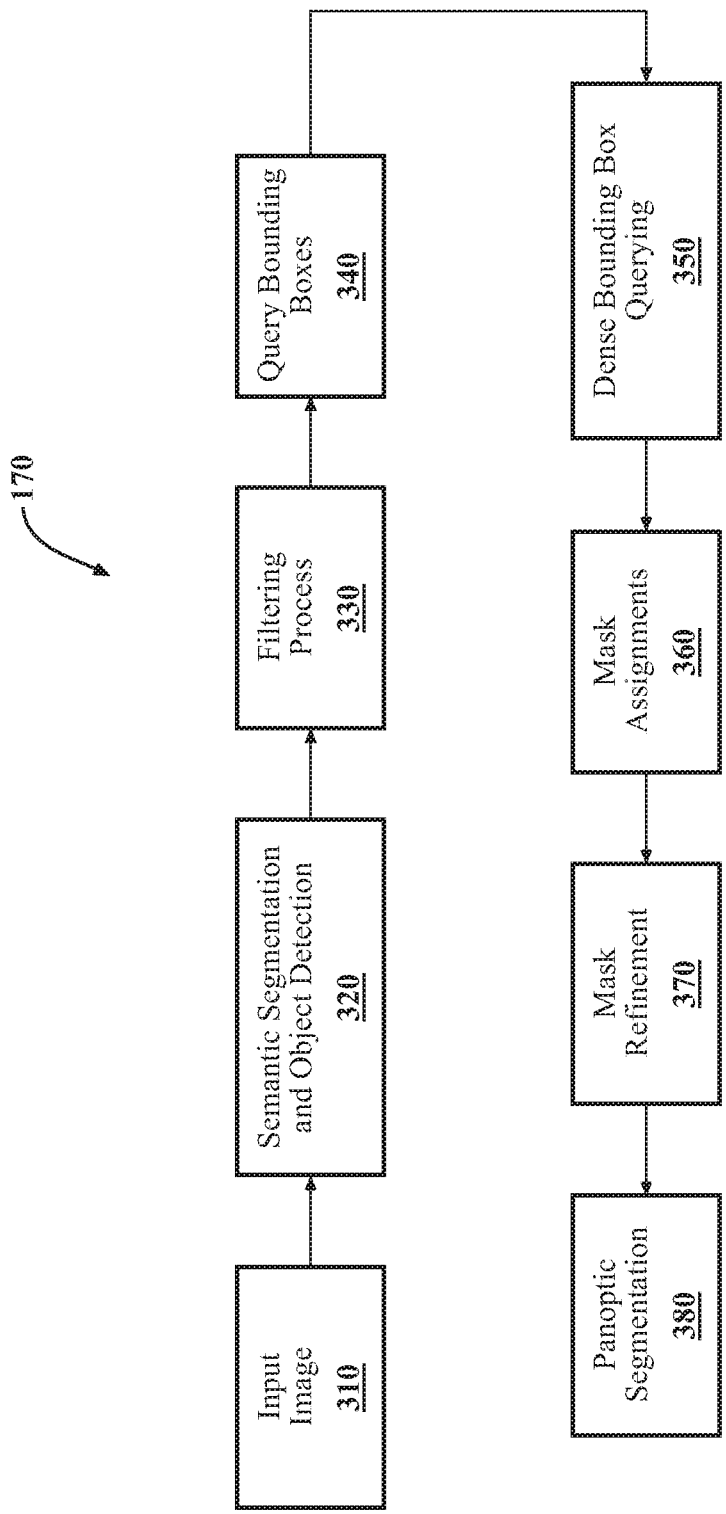
FIG. 3A is a functional block diagram of a panoptic image segmentation system, in accordance with an illustrative embodiment of the invention.

FIG. 3A is a functional block diagram of a panoptic image segmentation system 170, in accordance with an illustrative embodiment of the invention. FIG. 3A summarizes the functions performed by neural network module 220 and fusion module 230 described above. In the embodiment of FIG. 3A, an input image 310 is input to semantic segmentation and object detection processes 320, which are performed by neural network module 220. As discussed above, in some embodiments, these operations are performed in parallel or substantially in parallel by a CNN, and panoptic image segmentation system 170 operates in real time with respect to the frame rate of an imaging system that produces the input images 310. As also discussed above, neural network module 220, in connection with performing object detection, generates a plurality of bounding boxes associated with each of one or more objects in input image 310.

Figure 3B:
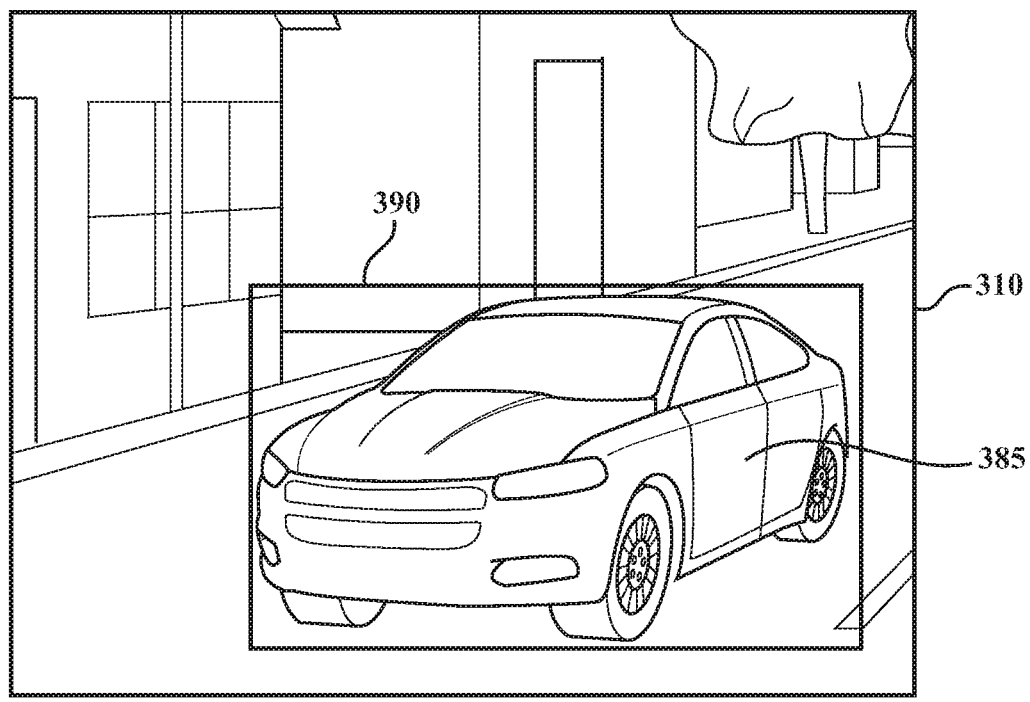
FIG. 3B illustrates an input image depicting an object and a plurality of bounding boxes associated with the object, in accordance with an illustrative embodiment of the invention.

FIG. 3B illustrates an input image 310 depicting an object 385 (in this example, a vehicle) and a bounding box 390 associated with the object 385, in accordance with an illustrative embodiment of the invention. In the example of FIG. 3B, only one bounding box 390 is shown for clarity. Upon completion of object detection by neural network module 220, object 385 would have a plurality of associated bounding boxes (e.g., one for each pixel that belongs to object 385), as discussed above. This technique may be termed "dense object detection."

The remaining operations shown in FIG. 3A are performed by fusion module 230. Filtering process 330 (e.g., an NMS algorithm) selects a query bounding box from among the plurality of bounding boxes associated with each detected object in the input image to produce query bounding boxes 340. For each object in the input image, a process of dense bounding box querying 350 maps one or more bounding boxes other than the query bounding box to the query bounding box 340 based on similarity to generate a mask assignment for the object (see mask assignments 360 in FIG. 3A). In one embodiment, the similarity between a given bounding box and the query bounding box is quantified as the relative ratio of overlapping area between the bounding box in question and the query bounding box.

Fusion module 230 performs mask refinement 370 by comparing the resulting mask assignments for the objects with the results of semantic segmentation produced by neural network module 220 to produce a refined set of mask assignments for the respective objects. Upon completion of a merging or fusion operation (not shown in FIG. 3A), fusion module 230 outputs a panoptic segmentation 380 of the input image 310. Certain embodiments of panoptic image segmentation system 170 are next described in greater detail, including the mathematical concepts and techniques.

The particular embodiments described below in connection with FIGS. 4A and 4B (hereinafter "these embodiments") resolve the deployment difficulties associated with multi-stage models by grafting a single-stage panoptic head directly onto the backbone, which simultaneously performs object detection and semantic segmentation (see the discussion of neural network module 220 above). This approach is friendly to inference-engine deployment, requiring less memory copying and re-sampling. These embodiments also make efficient use of network kernels, avoiding the prediction of redundant information from different sequential branches. The result is real-time inference with high accuracy.

These embodiments define a panoptic segmentation task ($\mathcal{P}$) that involves solving a semantic segmentation task ($\mathcal{S}$) and a dense-bounding-box object-detection task ($\mathcal{B}$). The objective of panoptic segmentation is to predict semantic and instance identifiers (IDs) for each pixel (x, y) in an input image 310: $\mathcal{P}(x, y)=(c, k)$, with $c \in \{1, \ldots, N\}$ and $k \in \mathbb{Z}$, where c is the semantic class ID, k is the instance ID (0 for all "stuff" classes, in some embodiments), and N is the total number of classes, including "stuff" ($N_{stuff}$) and things ($N_{things}$) classes.

In the semantic segmentation sub-task, these embodiments predict a distribution over semantic classes for each pixel (x, y): $\mathcal{S}(x, y)=s$, with $s \in \mathbb{R}^N$ and $s[c]=\hat{P}_{sem}(x, y, c)$, where the highest probability over the estimated pixel-wise distribution is taken as the final prediction.

In the dense-bounding-box object-detection sub-task, these embodiments predict at least one bounding box at each location (pixel) in the input image: $\mathcal{B}(x, y)=B$, with $B=(b, c)$, $b=(x_1, x_2, y_1, y_2) \in \mathbb{R}^4$, and $c \in \{1, \ldots, N_{things}\}$, where $(x_1, y_1)$ and $(x_2, y_2)$ are the coordinates of the left-top and bottom-right corners of bounding box B to which pixel (x, y) belongs and c is the predicted class ID for the corresponding bounding box. Those skilled in the art will recognize that because $\mathcal{S}$ and $\mathcal{B}$ are of fixed dimensions, they can be directly learned and predicted by a fully convolutional neural network (CNN).

Given $\mathcal{S}$ and $\mathcal{B}$, these embodiments employ a parameter-free mask reconstruction algorithm to produce instance masks (mask assignments) based on a global self-attention mechanism. The following operations can be performed in parallel. First, fusion module 230 obtains a reduced set of bounding-box proposals from $\mathcal{B}$ through NMS: $\mathcal{B}_{query}=\{B_j\}$, where $B_j=(b_j, c_j)$. The bounding-box proposal set is denoted $\mathcal{B}_{query}$ because it is used, in a sense, to "search" for instance masks. For each query bounding box $B_j$, fusion module 230 constructs a global mask probability map given by $\mathcal{M}(x, y, j)=\hat{P}_{loc}(x, y, j) \cdot \hat{P}_{sem}(x, y, c_j)$, where $\hat{P}_{loc}(x, y, j)$ is an estimated probability that pixel (x, y) shares the same bounding box as object j. This probability is approximated with self-attention between the global set of bounding boxes $\mathcal{B}$ and the query bounding box $B_j$: $\hat{P}_{loc}(x, y, j)=\text{IoU}(\mathcal{B}(x, y), B_j)$. $\hat{P}_{sem}(x, y, c_j)$ is the probability that pixel (x, y) shares the same semantic class as object j, which is given by $\hat{P}_{sem}(x, y, c_j)=\mathcal{S}(x, y)[c_j]$. Fusion module 230 can construct the final set of instance masks $\{M_j\}$ by applying a simple threshold σ to the global mask probability map: $M_j(x, y)=\mathcal{M}(x, y, j)>\sigma$. To produce the final panoptic segmentation 380, fusion module 230 performs a fusion (merging) process.

These embodiments employ a single-stage panoptic segmentation neural network with real-time inference efficiency. FIG. 4A is an architecture diagram of a neural network 400 for panoptic image segmentation, in accordance with an illustrative embodiment of the invention. This architecture is built on a ResNet-50 Feature Pyramid Network (FPN) (ResNet-50-FPN 405) backbone. In this embodiment, ResNet-50-FPN 405 includes five levels corresponding to strides of 128, 64, 32, 16, and 8 with respect to the input image. These embodiments also include a finer-grained target assignment scheme and additional single-convolution layers for semantic segmentation and a "levelness" prediction for object detection, which is described further below. The illustrated framework also leverages the fully tensorizable mask-construction algorithm described above, and these embodiments include an explicit instance-mask loss that further improves the quality of the final panoptic segmentation. As shown in FIG. 4A, the output of ResNet-50-FPN 405 is input to a set of panoptic heads 410, whose outputs are fed to object-detection (levelness) elements 415 and semantic-segmentation elements 420. Some of the details of the structure of object detection elements 415 and semantic segmentation elements 420 are indicated in FIG. 4A.

Figure 4A:
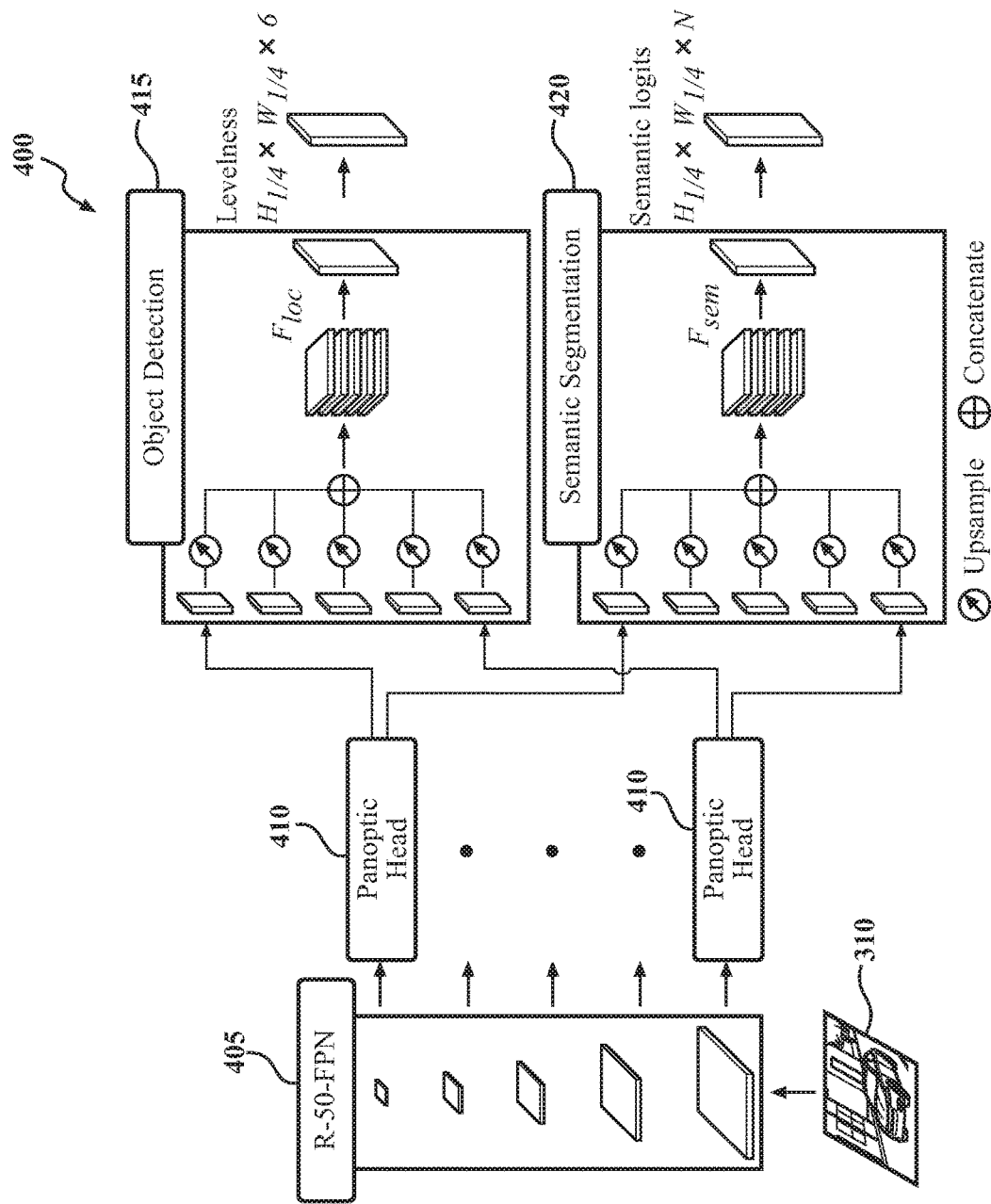
FIG. 4A is an architecture diagram of a neural network for panoptic image segmentation, in accordance with an illustrative embodiment of the invention.
Figure 4B:
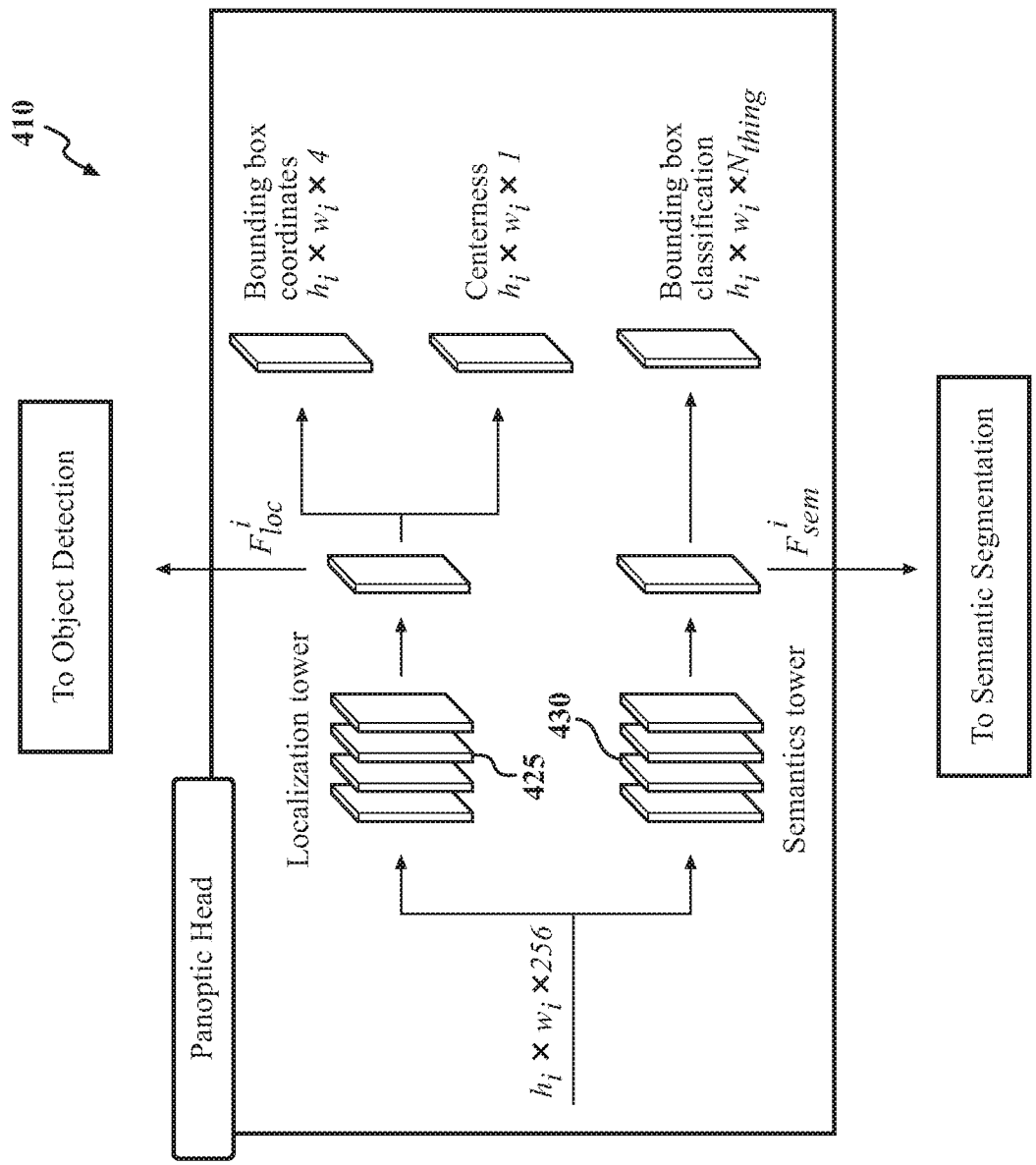
FIG. 4B is an architecture diagram of a panoptic head of the neural network for panoptic image segmentation shown in FIG. 4A, in accordance with an illustrative embodiment of the invention.

FIG. 4B is an architecture diagram of a panoptic head 410 of the neural network 400 for panoptic image segmentation shown in FIG. 4A, in accordance with an illustrative embodiment of the invention. These embodiments include a unified panoptic head that is shared by each of the multiscale feature maps produced by the backbone (ResNet-50-FPN 405, in FIG. 4A). On each feature map, two feature towers, localization tower 425 and semantics tower 430, are applied. Each tower includes four sequential convolutional blocks (Conv+GroupNorm+ReLU).

At each pixel location (x, y) of FPN level $F_i$, panoptic head 410 uses the extracted features to predict bounding-box offsets $\hat{t}_{xy}$, centerness $\hat{o}_{xy}$, and bounding-box class probabilities $\hat{c}_{xy}$. The bounding-box offset is predicted from the localization tower 425, and the bounding-box class probability distribution is predicted from the semantics tower 430. To compute a loss on bounding-box regression, panoptic head 410 employs an intersection-over union (IoU) loss as follows:

$$\mathcal{L}_{box\_reg} = \frac{1}{N_{fg}} \sum_i \sum_{xy} L_{BCE}(\hat{o}_{xy}, o_{xy}) \mathbb{1}_{fg}(x, y).$$

Finally, panoptic head 410 predicts a probability distribution over object classes $\hat{c}_{xy} \in \mathbb{R}^{N_{things}}$ for all feature locations (x, y), including background pixels. In these embodiments, the bounding-box classification loss $\mathcal{L}_{box\_cls}$ is a standard sigmoid focal loss averaged over the total number of locations across all FPN levels.

Panoptic head 410, in addition to the per-level predictions, leverages the intermediate features from the two towers ($F_{loc}{}^i$ and $F_{sem}{}^i$) to globally predict (1) Levelness $\mathcal{J}$: the FPN level that the bounding box at each location (x, y) belongs to (with zero reserved for background pixels); and (2) Semantic segmentation $\mathcal{S}$: the semantic class probability distribution over N classes. As depicted in FIG. 4A, $F_{loc}{}^i$ and $F_{sem}{}^i$ are upsampled to an intermediate size of (H/4, W/4) and concatenated into a global $F_{loc}$ and $F_{sem}$. The levelness is predicted from $F_{loc}$ through a single convolutional layer and is supervised by a FPN level assignment policy. Training module 240 trains the levelness using a multi-class cross-entropy loss: $\mathcal{L}_{levelness} = L_{CE}(\mathcal{J}, \mathcal{J}^t)$. At inference time, for every pixel (x, y), neural network 400 produces a bounding-box prediction $\hat{b}_{xy}{}^{(i)}$ from each FPN level $F_i$. Levelness indicates which $\hat{b}_{xy}{}^{(i)}$ to include in the global set of dense bounding-box predictions $\mathcal{B}$: $\mathcal{B}(x, y) =$ $$\hat{b}_{xy}^{(\text{argmax } \mathcal{J}(x,y))}$$

Instead of using a separate branch for semantic segmentation, neural network 400 reuses the same features as bounding-box classification. This dramatically reduces the number of parameters and inference time of neural network 400. Neural network 400 predicts the full class semantic logits from $F_{sem}$, which training module 240 supervises during training using a cross-entropy loss: $\mathcal{L}_{semantics} = L_{CE}(\mathcal{S}, \mathcal{S}^t)$, where $\mathcal{S}^t$ denotes semantic labels. These embodiments bootstrap this loss to penalize only the worst 30% of predictions.

Figure 5:
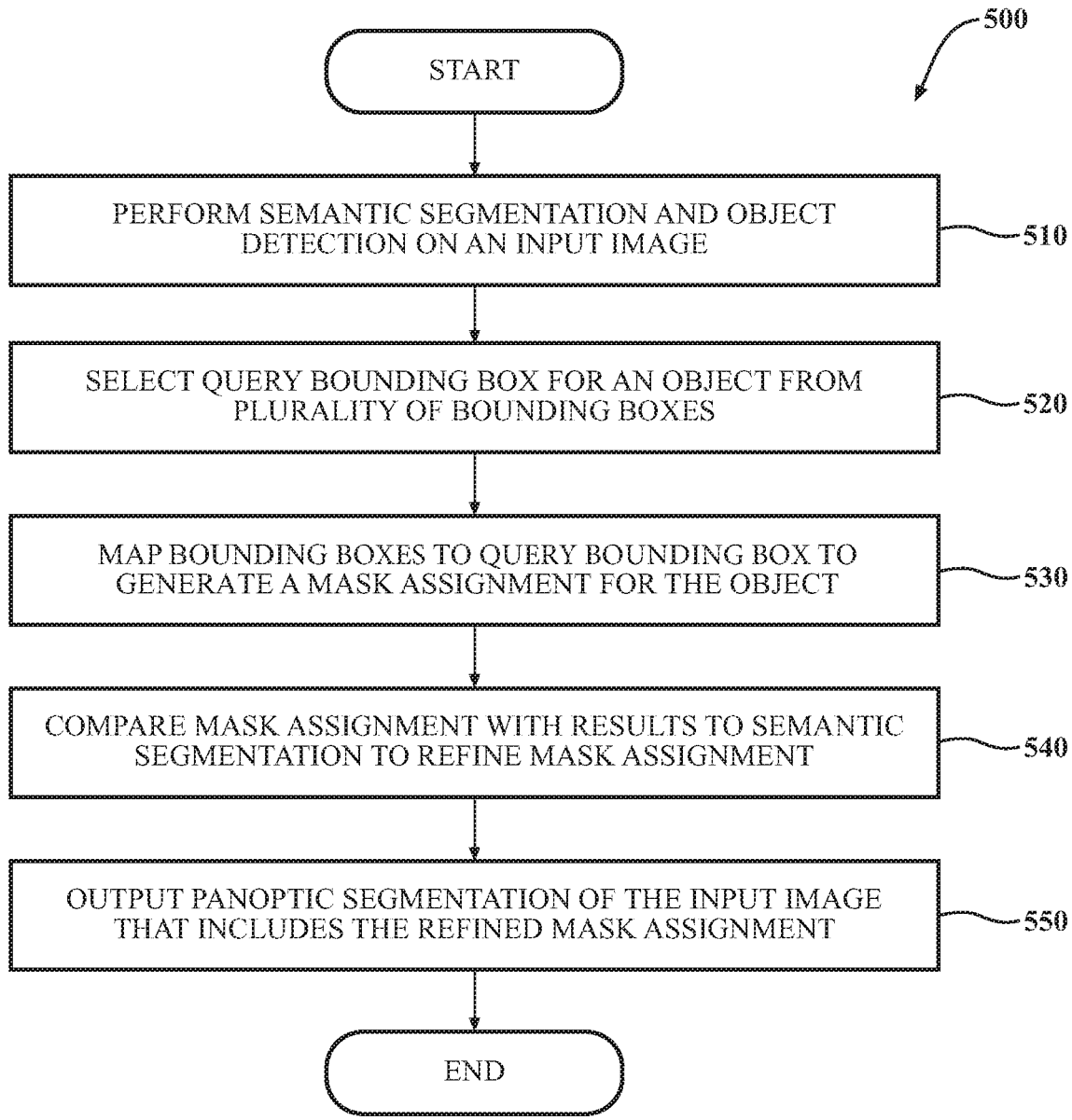
FIG. 5 is a flowchart of a method of panoptic image segmentation, in accordance with an illustrative embodiment of the invention.

FIG. 5 is a flowchart of a method 500 of panoptic image segmentation, in accordance with an illustrative embodiment of the invention. Method 500 will be discussed from the perspective of panoptic image segmentation system 170 in FIG. 2. While method 500 is discussed in combination with panoptic image segmentation system 170, it should be appreciated that method 500 is not limited to being implemented within panoptic image segmentation system 170, but panoptic image segmentation system 170 is instead one example of a system that may implement method 500.

At block 510, neural network module 220 performs semantic segmentation and object detection on an input image 310. In some embodiments, the input image 310 is in red-green-blue (RGB) format. In other embodiments, a different image format may be used. As discussed above, object detection generates a plurality of bounding boxes associated with an object in the input image. In one embodiment, neural network module 220 produces a bounding box for each pixel. Thus, an object including a plurality of pixels will have a plurality of bounding boxes associated with it. In some embodiments, each bounding box associated with the object has an associated confidence level. As also discussed above, in some embodiments the semantic segmentation and object detection are performed in parallel or substantially in parallel by a neural network 400 (e.g., a CNN) associated with neural network module 220, and panoptic image segmentation system 170 operates in real time with respect to the frame rate of an imaging system that produces the input image 310.

At block 520, fusion module 230 selects a query bounding box 340 from among the plurality of bounding boxes. As discussed above, in some embodiments, this is accomplished using a NMS algorithm. In other embodiments, a different filtering algorithm can be used. In one embodiment, the query bounding box is the bounding box among the plurality of bounding boxes that has the highest confidence level.

At block 530, fusion module 230 map at least one of the bounding boxes in the plurality of bounding boxes other than the query bounding box to the query bounding box based on similarity between the at least one of the bounding boxes and the query bounding box to generate a mask assignment (instance mask) for the object, the mask assignment defining the contour (outline shape) of the object. As discussed above, in one embodiment, the similarity between a given bounding box and the query bounding box is quantified as the relative ratio of overlapping area between the bounding box in question and the query bounding box.

At block 540, fusion module 230 compares the mask assignment with results of the semantic segmentation performed by neural network module 220 to produce a refined mask assignment for the object. As discussed above, this may be thought of as a "clean-up" operation (e.g., differentiating between pixels associated with the object and pixels associated with a background "stuff" class such as "sky" or "roadway").

At block 550, fusion module 230 outputs a panoptic segmentation 380 of the input image 310 that includes the refined mask assignment 360 for the object. As discussed above, this is accomplished through a merging operation by fusion module 230. In some embodiments, the output panoptic segmentation of the input image includes, for each pixel in the input image, a semantic class identifier and an instance identifier. For example, pixels associated with a countable object such as a vehicle might have a semantic class identifier "vehicle" (an example of a "thing" class) and an instance identifier of "3," if that vehicle is labeled as the third vehicle among a plurality of identified vehicles in the input image. For pixels assigned to "stuff" classes, the instance identifier can be set to zero, in some embodiments.

As discussed above, though the foregoing discussion of method 500 focuses on a particular detected object in the input image 310, the same functions leading ultimately to a panoptic segmentation 380 of the input image 310 can be performed for each of a plurality of objects in the input image 310, where the input image includes multiple objects.

As discussed above, in some embodiments, panoptic image segmentation system 170 is integrated with a vehicle. In some of those embodiments, the vehicle is an autonomous vehicle. Panoptic image segmentation system 170 may also be integrated with a variety of other kinds of robots, including humanoid robots.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for panoptic image segmentation, the system comprising:
    one or more processors; and
    a memory communicably coupled to the one or more processors and storing:
    a neural network module including instructions that when executed by the one or more processors cause the one or more processors to perform semantic segmentation and object detection on an input image, wherein the object detection generates a plurality of bounding boxes associated with an object in the input image and each bounding box in the plurality of bounding boxes corresponds to a particular pixel associated with the object; and
    a fusion module including instructions that when executed by the one or more processors cause the one or more processors to:
        select a query bounding box from among the plurality of bounding boxes, wherein the query bounding box has a highest associated level of confidence among the plurality of bounding boxes associated with the object;
        map at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object;
        compare the mask assignment with results of the semantic segmentation to produce a refined mask assignment for the object; and
        output, using a fusion operation, a panoptic segmentation of the input image that includes the refined mask assignment for the object.

2. The system of claim 1, wherein the panoptic segmentation of the input image includes, for each pixel in the input image, a semantic class identifier and an instance identifier.

3. The system of claim 1, wherein the instructions in the neural network module to perform the semantic segmentation and the object detection include instructions that cause the one or more processors to perform the semantic segmentation and the object detection in parallel and the system operates in real time with respect to a frame rate of an imaging system that produces the input image.

4. The system of claim 3, wherein the instructions in the neural network module to perform the semantic segmentation and the object detection include instructions to perform the semantic segmentation and the object detection using a convolutional neural network (CNN).

5. The system of claim 1, wherein the instructions in the fusion module to select a query bounding box from among the plurality of bounding boxes include instructions to select the query bounding box from among the plurality of bounding boxes using a Non-Maximum Suppression (NMS) algorithm.

6. The system of claim 1, wherein the input image is in a red-green-blue (RGB) format.

7. The system of claim 1, wherein the system is integrated with a vehicle.

8. The system of claim 7, wherein the vehicle is an autonomous vehicle.

9. A non-transitory computer-readable medium for panoptic image segmentation and storing instructions that when executed by one or more processors cause the one or more processors to:
perform semantic segmentation and object detection on an input image using a neural network, wherein the object detection generates a plurality of bounding boxes associated with an object in the input image and each bounding box in the plurality of bounding boxes corresponds to a particular pixel associated with the object;
select a query bounding box from among the plurality of bounding boxes, wherein the query bounding box has a highest associated level of confidence among the plurality of bounding boxes associated with the object;
map at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object;
compare the mask assignment with results of the semantic segmentation to produce a refined mask assignment for the object; and
output, using a fusion operation, a panoptic segmentation of the input image that includes the refined mask assignment for the object.

10. The non-transitory computer-readable medium of claim 9, wherein the instructions to perform the semantic segmentation and the object detection include instructions that cause the one or more processors to perform the semantic segmentation and the object detection in parallel.

11. The non-transitory computer-readable medium of claim 10, wherein the instructions to perform the semantic segmentation and the object detection include instructions to perform the semantic segmentation and the object detection using a convolutional neural network (CNN).

12. A method of panoptic image segmentation, the method comprising:
performing semantic segmentation and object detection on an input image using a neural network, wherein the object detection generates a plurality of bounding boxes associated with an object in the input image and each bounding box in the plurality of bounding boxes corresponds to a particular pixel associated with the object;
selecting a query bounding box from among the plurality of bounding boxes, wherein the query bounding box has a highest associated level of confidence among the plurality of bounding boxes associated with the object;
mapping at least one of the bounding boxes in the plurality of bounding boxes other than the query bounding box to the query bounding box based on similarity between the at least one of the bounding boxes and the query bounding box to generate a mask assignment for the object, the mask assignment defining a contour of the object;
comparing the mask assignment with results of the semantic segmentation to produce a refined mask assignment for the object; and
outputting, using a fusion operation, a panoptic segmentation of the input image that includes the refined mask assignment for the object.

13. The method of claim 12, wherein the panoptic segmentation of the input image includes, for each pixel in the input image, a semantic class identifier and an instance identifier.

14. The method of claim 12, wherein the semantic segmentation and the object detection are performed in parallel and the method is carried out in real time with respect to a frame rate of an imaging system that produces the input image.

15. The method of claim 14, wherein the semantic segmentation and the object detection are performed using a convolutional neural network (CNN).

16. The method of claim 12, wherein the selecting the query bounding box from among the plurality of bounding boxes includes use of a Non-Maximum Suppression (NMS) algorithm.

17. The method of claim 12, wherein the input image is in a red-green-blue (RGB) format.

* * * * *